US011165597B1

(12) United States Patent
Matsuguma et al.

(10) Patent No.: US 11,165,597 B1
(45) Date of Patent: Nov. 2, 2021

(54) DIFFERENTIATING ATTENDEES IN A CONFERENCE CALL

(71) Applicant: International Business Machines Corporation, Armonk, NY (US)

(72) Inventors: Junji Matsuguma, Kanagawa (JP); Hiroyuki Tanaka, Ota-ku (JP); Yutaka Kawai, Suginami (JP); Norio Ueguri, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/160,733

(22) Filed: Jan. 28, 2021

(51) Int. Cl.
*G06F 15/16* (2006.01)
*H04L 12/18* (2006.01)
*G06N 20/20* (2019.01)

(52) U.S. Cl.
CPC ......... *H04L 12/1831* (2013.01); *G06N 20/20* (2019.01); *H04L 12/1822* (2013.01)

(58) Field of Classification Search
None
See application file for complete search history.

(56) References Cited

U.S. PATENT DOCUMENTS

| | | |
|---|---|---|
| 2005/0018828 A1 | 1/2005 | Nierhaus |
| 2011/0285807 A1 | 11/2011 | Feng |
| 2014/0156833 A1* | 6/2014 | Robinson ............... H04L 43/12 709/224 |
| 2018/0204576 A1 | 7/2018 | Dhoot |
| 2018/0284907 A1* | 10/2018 | Kolahdouzan ...... H04L 12/1827 |
| 2018/0350144 A1* | 12/2018 | Rathod ............. G06Q 20/3276 |
| 2019/0020747 A1* | 1/2019 | Gerace .................. G06T 7/0002 |
| 2019/0228380 A1* | 7/2019 | Shen ...................... G10L 15/26 |
| 2019/0295041 A1* | 9/2019 | Sim ........................ G10L 15/02 |
| 2019/0341050 A1 | 11/2019 | Diamant |
| 2020/0228358 A1* | 7/2020 | Rampton ............... G06N 20/00 |
| 2021/0201271 A1* | 7/2021 | Vukich ................... G06N 20/00 |

FOREIGN PATENT DOCUMENTS

WO   WO-2020148658 A2 *  7/2020   ......... G06Q 30/0241

OTHER PUBLICATIONS

Elizabeth A. Bretz, Virtual Meetings in Desktop Conferencing, 1998, IEEE Xplore, IEEE Spectrum, pp. 47-56.*
(Continued)

*Primary Examiner* — Phyllis A Book
(74) *Attorney, Agent, or Firm* — David K. Mattheis; Maeve M. Carpenter

(57) ABSTRACT

Differentiating video call attendees by receiving an identifier, voice data, and facial image data, for a video call attendee, associating a first machine learning model output, a second machine learning model output and the identifier with the video call attendee, receiving video call data, the video call data comprising voice data and facial image data, identifying the video call attendee from the video call data using the first machine learning model, identifying a display location of the video call attendees face from the video call data using the second machine learning model, augmenting the video call data with a mark at a mark location, and displaying the augmented video call data.

20 Claims, 5 Drawing Sheets

(56) References Cited

OTHER PUBLICATIONS

"Fairy Devices", mimi® A comprehensive platform for voice AI, downloaded from the Internet on Aug. 27, 2020, 14 pages, <https://www.fairydevices.jp/mimi_about.html>.

"Minutes Web service "GIJI" Voice recognition started", Agileware Co. Press Release Sep. 17, 2019, 16 pages, <https://www.atpress.ne.jp/news/193630>.

"Speaker recognition", Wikipedia, This page was last edited on Jul. 21, 2020, 4 pages.

"Video Face Recognition Technology for Real-Time Monitoring", NEC Technical Journal, Special Issue on Social Value Creation by AI, vol. 69 (2016) No. 1 (September), 24 pages, <https://jpn.nec.com/techrep/journal/g16/n01/160108.html>.

Mell et al., "The NIST Definition of Cloud Computing", Recommendations of the National Institute of Standards and Technology, Special Publication 800-145, Sep. 2011, 7 pages.

* cited by examiner

DIFFERENTIATING ATTENDEES IN A CONFERENCE CALL

BACKGROUND

The disclosure relates generally to the differentiation of attendees in a video conference call. The disclosure relates particularly to identifying a speaker in a conference call from audio and/or video using machine learning.

Web conferencing systems enable conference calls sharing audio and video from remote participants using input devices including microphones and cameras incorporated into laptop or desktop computers. Voice recognition technology enables the identification of an individual by matching audio to a learned audio signature for an individual. Facial recognition technology enables the recognition of an individual by matching video input to a learned facial signature for the individual. Speech to text technology enables the automatic transcription of audio streams to text.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable differentiating speakers during a video conference call.

Aspects of the invention disclose methods, systems and computer readable media associated with differentiating video call attendees by receiving an identifier, voice data, and facial image data, for a video call attendee, associating a first machine learning model output, a second machine learning model output and the identifier with the video call attendee, receiving video call data, the video call data comprising voice data and facial image data, identifying the video call attendee from the video call data using the first machine learning model, identifying a display location of the video call attendees face from the video call data using the second machine learning model, augmenting the video call data with a mark at a mark location, and displaying the augmented video call data.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
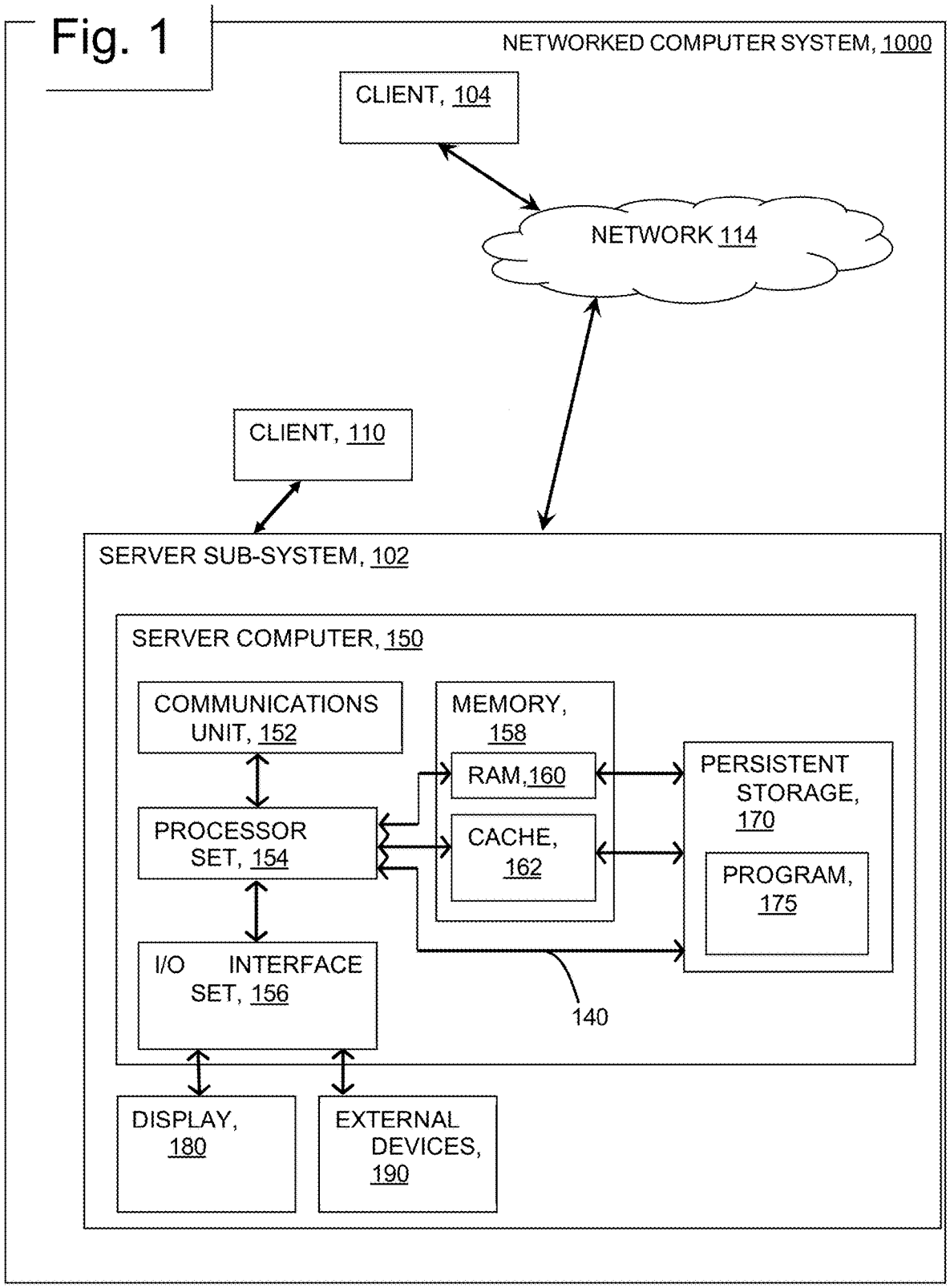
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Networked video conferencing systems are increasingly popular as a simple collaboration tool connecting multiple locations in/across an enterprise. Video conferencing has become an important tool for promoting work style reforms. These conferencing systems may presume that each participant uses a computer or smartphone with built-in camera and microphone. But sometimes one computer in a conference room is used for multiple participants to attend. In such a case, depending on the arrangement of the seats relative to the camera, confirmation of the speaker may be required each time a participant speaks in order to identify the speaker. Repeatedly confirming the speaker's name with customers may cause discomfort and create obstacles to the business relationship. Conventional solutions for this situation include adjusting a camera position so that all participants are shown, or the use of multiple remote-controlled cameras and/or directional microphone systems to detect the speaker. Such solutions cannot identify a name of the speaker. This technology enables the location of a speaker by the direction of voice using one or more directional microphones but requires a complex system and does not identify speakers by name.

Disclosed embodiments enable the identification and labeling of active speakers using artificial intelligence models. A trained machine learning model identifies a speaker from conference call voice data and a second machine learning model locates the face of the identified speaker in the video data. Disclosed embodiments then augment the video data, adding an indicator showing who is speaking. Disclosed methods automatically analyze and augment the conference call data identifying each speaker without disrupting the flow of the conference call discussion.

In an embodiment, one or more components of the system can employ hardware and/or software to solve problems that are highly technical in nature (e.g., receiving an identifier, voice data, and facial image data, for a video call attendee, training a first machine learning model to identify the video call attendee using the voice data, training a second machine learning model to identify the video call attendee using the facial image data, associating a first machine learning model output, a second machine learning model output and the identifier with the video call attendee, receiving video call data, the video call data comprising voice data and facial image data, identifying the video call attendee from the video call data using the first machine learning model, identifying a display location of the video call attendees face from the video call data using the second machine learning model, augmenting the video call data with a mark at a mark location, displaying the augmented video call data, etc.). These solutions are not abstract and cannot be performed as a set of mental acts by a human due to the processing capabilities needed to facilitate differentiating and identifying conference call speakers, for example. Further, some of the processes performed may be performed by a specialized computer for carrying out defined tasks related to differentiating conference call attendees. For example, a specialized computer can be employed to carry out tasks related to identifying conference call attendees, or the like.

In an embodiment, a system executing the attendee differentiation method receives data associated with one or more prospective meeting attendees. For each prospective meeting attendee, the method receives an identifier, including for example an individual's name, title, organization, etc. The data further includes a voice sample from the individual, where voice data may include a recitation of the individual's name and title as well as recitation of common phrases such as the Aesop's fable *The North Wind and the Sun*, intended to provide a representative sampling of the common phonetic units of a selected language. The prospective attendee data further includes at least one facial image of the attendee. In this embodiment, the method receives the data for each prospective attendee as an associated set of data where the identifier, voice data, and facial image are linked and associated with the prospective attendee. In this embodiment, the voice data, identifiers, and facial image data are provided by the prospective attendee and used for the disclosed method with the consent of the prospective attendees. The data may be provided to the system executing the methods by the attendees themselves or collected by a meeting/call host and provided as set of attendee data associated with a particular scheduled meeting such that only data associated with the attendees invited for participation at a particular location is provided by the host to the system for use by the method.

The method trains a first machine learning model such as a recurrent neural network (RNN), a variational autoencoder (VAE), or other classification machine learning model architecture, to classify digitized input voice data according to a particular speaker. The method trains the model to correctly classify the digitized voice data provided for each prospective attendee. In an embodiment, the method augments the original voice data set by parsing the data by individual phonetic units and assembling common combinations of phonetic units for the selected language and provides the augmented voice data set for training the machine learning model. In an embodiment, the method reserves a portion of the voice data for each attendee for use as test data to validate the trained machine learning model. The trained machine learning model enables the identification of a prospective attendee using new unlabeled voice data. The trained model provides an output identifying the attendee classified by the trained model from the new input voice data. The identifier data and facial image data of the identified attendee are select4ed by the method according to the trained model's output.

In an embodiment, the method also trains a second machine learning model for classifying facial image data. The method trains the machine learning model such as an RNN, VAE, or similar classification machine learning model architecture, using the provided prospective attendee digitized facial image data. In an embodiment, the method augments the prospective attendee facial image data set by rotating the provided images and by cropping the images yielding partial facial images of the prospective attendees. The trained second machine learning model enables the identification of the display location of the face of each prospective attendee within the digitized frames of new video data. In an embodiment, the method reserves a portion of the augmented facial image data set for each prospective attendee for use in validating the trained machine learning model. After identifying the display location of the facial image for an attendee in the video frame data, the method maintains a mapping of the set of locations for the set of attendees and the associated attendee identifier data.

The method receives video conference call data including digitized audio data and digitized video data frames. The method passes the digitized audio to the first machine learning model. The first machine learning model outputs the identity of a speaker identified as speaking in the audio data. The method associates the identified speaker with the speaker's identity and facial image data. The method passes the associated facial image data to the second machine learning model along with the digitized video data frames. The second machine learning model searches the video frame data and identifies the display location of the face of the identified speaker within the digitized video frame. In this embodiment, the method isolates and identifies a set of video pixels which includes the identified attendee's face. Over the course of the conference call, the method continues to receive audio and video data and to identify the speaker(s) using the first machine learning model and the display location of the speaker's face, using the second machine learning model. Changes in the camera angle also cause the second machine learning model to identify the new location of a current speaker in the video from of the new camera angle.

In some instances, more than a single attendee may be speaking at the same time. In such instances, the first machine learning model outputs more than a single attendee as the speaker, and the method associates each of multiple speakers with their respective identity and face data and passes the multiple face data to the second machine learning model. The second machine learning model identifies the sets of pixels associated with multiple speakers identified by the first machine learning model.

In an embodiment, the method identifies a mark location within the video frame for the identified speaker. In this embodiment, the method identifies a mark location near the set of pixels associated with the display location of the identified speaker. The method identifies and selects the mark location with consideration for user selections regarding visual elements to be incorporated into each mark. Elements such as an indicator "speaking", the speaker's name, title, and face image, may be selected for incorporation into the mark. The user may further select size and other attributes for each selected mark element, font, color, etc.

The method augments the original video data, adding the selected mark elements at the identified mark location within the video frame. The method provides the augmented video data to a system display which outputs the augmented video for viewing.

In an embodiment, the method receives facial image data for a set of attendees and trains the second machine learning model to identify and classify the faces of each attendee using the provided facial images. The trained model receives video image data including facial images of the attendees. The model identifies the display locations within the video frames of the face of each of the attendees. The method maps and stores the set of display locations for the set of attendees. In this embodiment, the method defines a corresponding set of mark locations, each mark location corresponding to an attendee face display location. The method defines the set of mark locations such that none of the mark locations overlap the face display locations of any of the attendees. With this consideration the method ensures that the display of information at a mark location will not block the display of any attendee faces.

The method considers a mark size in defining the mark locations to avoid blocking the faces of attendees. The mark size includes space of a combination of mark elements selected by a system user including attendee identifier, a label such as "speaking", and an attendee face image. The user may further select the display size, font, etc. for the different mark elements. The method considers the selected elements and chosen element sizing in determining a mark size. The method considers the determined mark size in defining a mark location for each identified attendee face display location to avoid blocking any other attendee face displays as well as any other attendee mark displays for circumstances wherein more than a single attendee is speaking.

In defining the mark location for each attendee, the method further considers the display locations of the faces of other attendees to define each mark location to clearly relate to a single attendee. As an example, for a video frame displaying a set of attendees arrayed on the sides of a conference table, the method defines mark locations for each attendee above or behind the attendee's face rather than between the faces of two attendees seated across the table from each other. Placing the mark location above or behind the attendee face display locations and not between faces reduces the likelihood of confusion regarding the attendee/mark location association.

In an embodiment, the method defines a single mark location for the scene contained in the video frame data. In this embodiment, the method defines a mark location large enough to display mark elements sized as selected by the user and avoid blocking the display of any attendee faces in the video frame. The method selects a single common location, such as a chyron across the bottom or top of the frame, or a mark location in a corner portion of the frame where no attendee faces are present. The common mark location may be used in conjunction with a face outline, where the method outlines the face of a current speaker and provides the speaker information such as name and face in the common mark location.

In an embodiment, the method tracks the current speaker(s) and the current displayed speaker marks. As the call proceeds and the current speaker stops speaking, analysis of the audio data by the first machine learning model indicates that change, no longer identifying the attendee as a current speaker. The method removes the mark associated with this attendee after the first model ceases to identify the attendee as currently speaking. In this manner, the marks identifying a current speaker appear and disappear in conjunction with the speaking activity of the call and do not simply accumulate upon the display.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise attendee differentiation program (not shown) together with sufficient computing resource (processor, memory, network communications hardware) to execute the program. Client devices 104 and 110 may include smart phone, laptop, or desktop computers systems including digital video and audio input devices. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the attendee differentiation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., attendee differentiation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
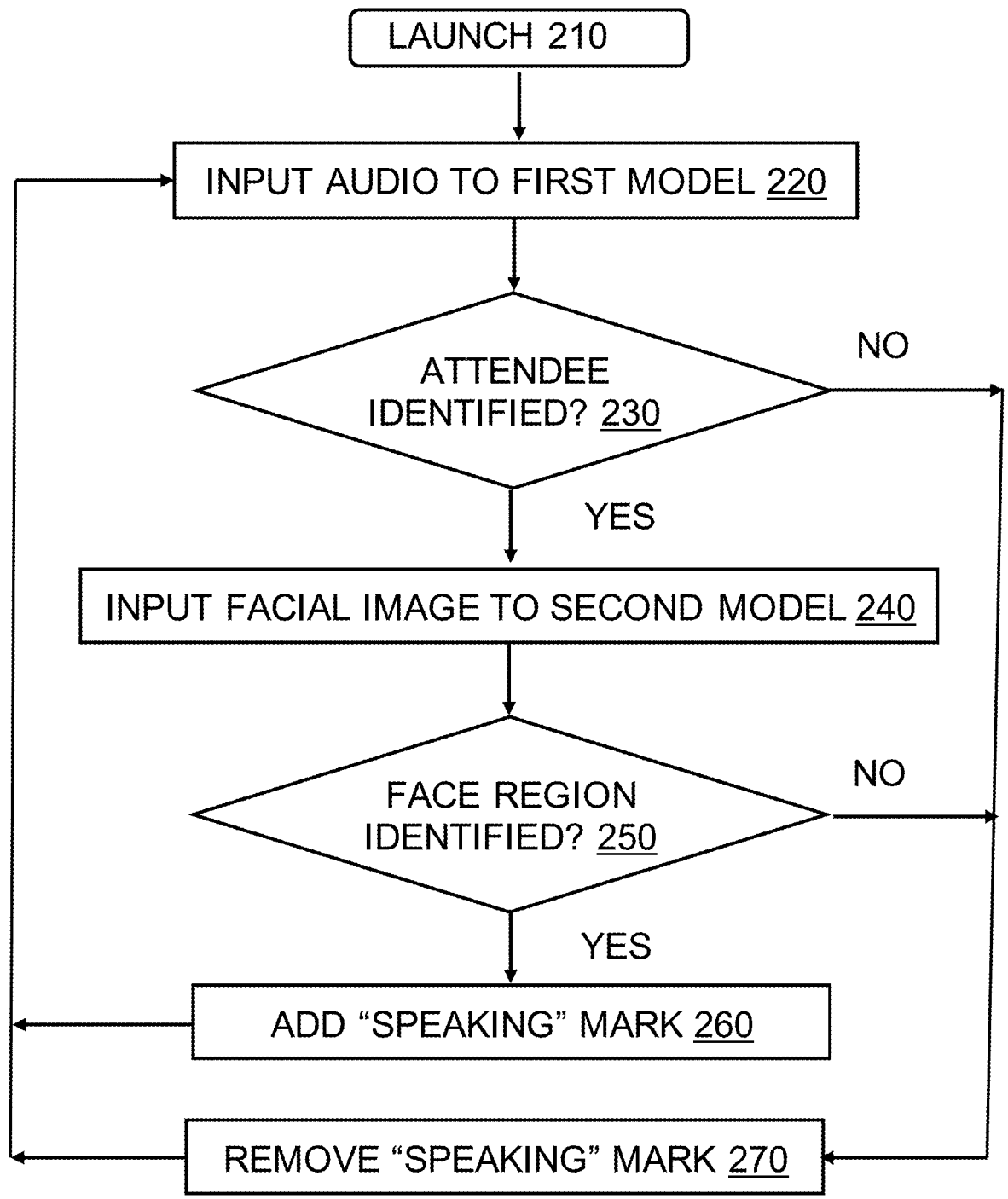
FIG. 2 provides a flowchart depicting an operational sequence, according to an embodiment of the invention.

FIG. 2 provides a flowchart 200, illustrating exemplary activities associated with the practice of the disclosure. Flowchart 200 illustrates steps of the attendee differentiation program 175 after a host or other user has provided the program sets of identifiers, audio signatures and attendee facial data. The steps of flowchart 200 further occur after the method has trained the first machine learning model to identify an attendee using audio data and to recognize attendee faces using video data.

At block 210, a user launches attendee differentiation program 175 including first and second machine learning models trained using data associated with prospective meeting attendees. At block 220, attendee differentiation program receives input audio and video data, such as audio from a digital microphone and video data from a digital camera. The digital audio data from the microphone passes to the first trained machine learning model.

Decision block 230 indicates whether or not the first machine learning model has identified an attendee from the audio data. After the first machine learning model identifies an attendee, the method passes facial image data associated with that attendee to the second machine learning model at 240. After a determination that no attendee has been, or can be, identified from the audio input, the method proceeds to block 270 and removes all "speaking" augmentation marks from the output data for the system display.

At decision block 250, the second machine learning model of attendee differentiation program 175 searches the video input data for a match to the provided facial image data for the attendee identifies by the first machine learning program. After the second machine learning model finds a face region matching the provided facial image data in the video input data, the method proceeds to block 260, where the method augments the video data with a "Speaking" mark at a mark location defined by the method for the attendee identified by the first machine learning model and the facial location identified by the second machine learning model. After augmenting the video data with the "Speaking" mark, the method returns to block 220 and continues to analyze the audio and video data input streams. When the second machine learning model cannot find a facial region matching the provided facial image data for the identified attendee, the method proceeds to block 270, removes any current speaking marks and then resumes the analysis of input audio at block 220.

Figure 3:
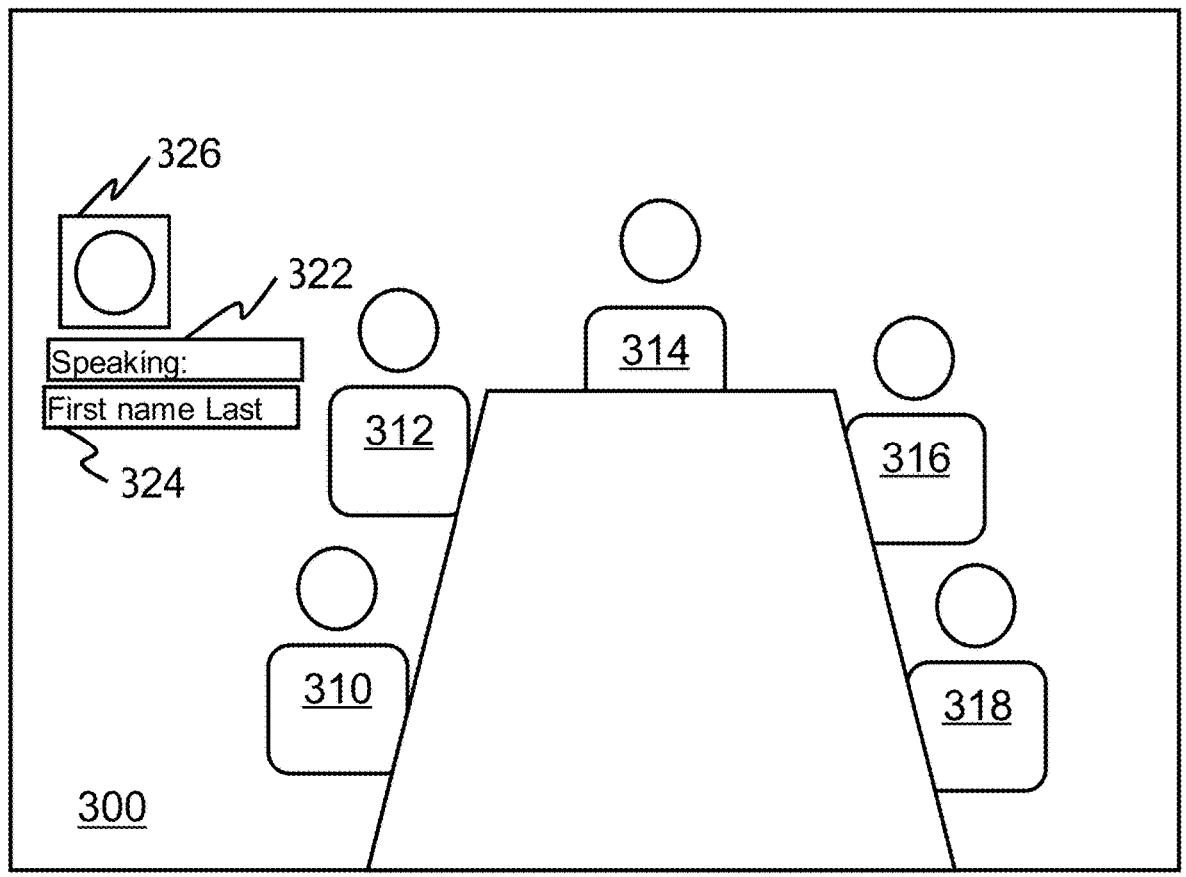
FIG. 3 depicts a computer display of conference call attendees, according to an embodiment of the invention.

FIG. 3 provides a schematic representation 300 of a computer display of augmented video output for a video conference call, according to an embodiment of the invention. As shown in the figure, a plurality of meeting attendees 310, 312, 314, 316, and 318, are seated around a conference table. Attendee 312 is speaking. After the first machine learning model of the method identifies attendee 312, the second machine learning model of the method identifies the face of attendee 312 in the video data and the method augments the video data with a "Speaking" mark, near the identified face of attendee 312. In this embodiment, the "Speaking" mark includes the word "speaking" 322, the attendee's identifier 324, First name Last, and the facial image 326 of the attendee. The "Speaking" mark to the video image behind and above the identified facial region of attendee 312 to avoid blocking the facial regions of attendees 310, 314, 316, and 318, and to prevent an ambiguous presentation of the speaking mark between attendees 312, 314, and 316. Implementation of disclosed embodiments may incorporate edge cloud or cloud resources to enable attendee differentiation during conference calls.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
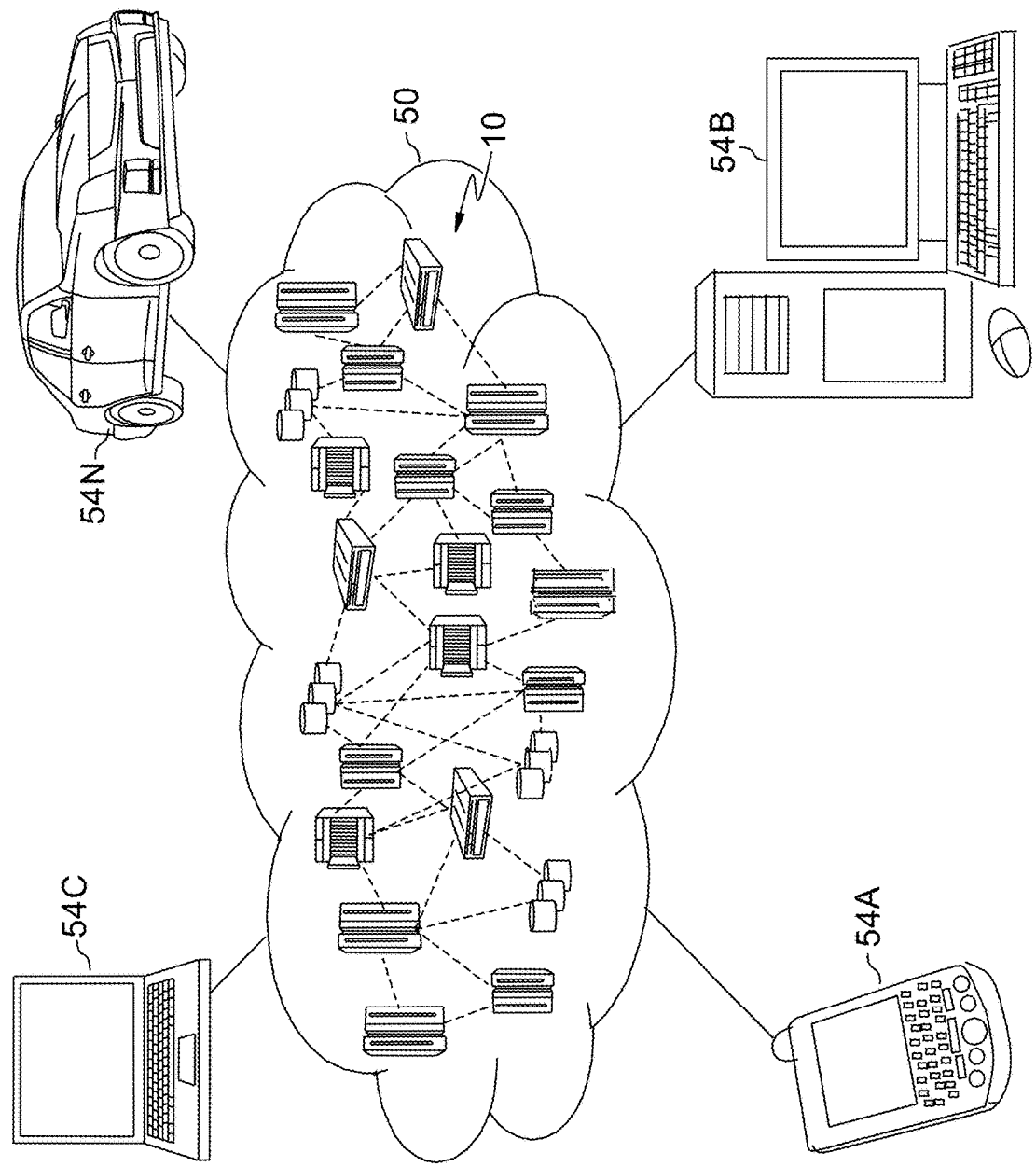
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
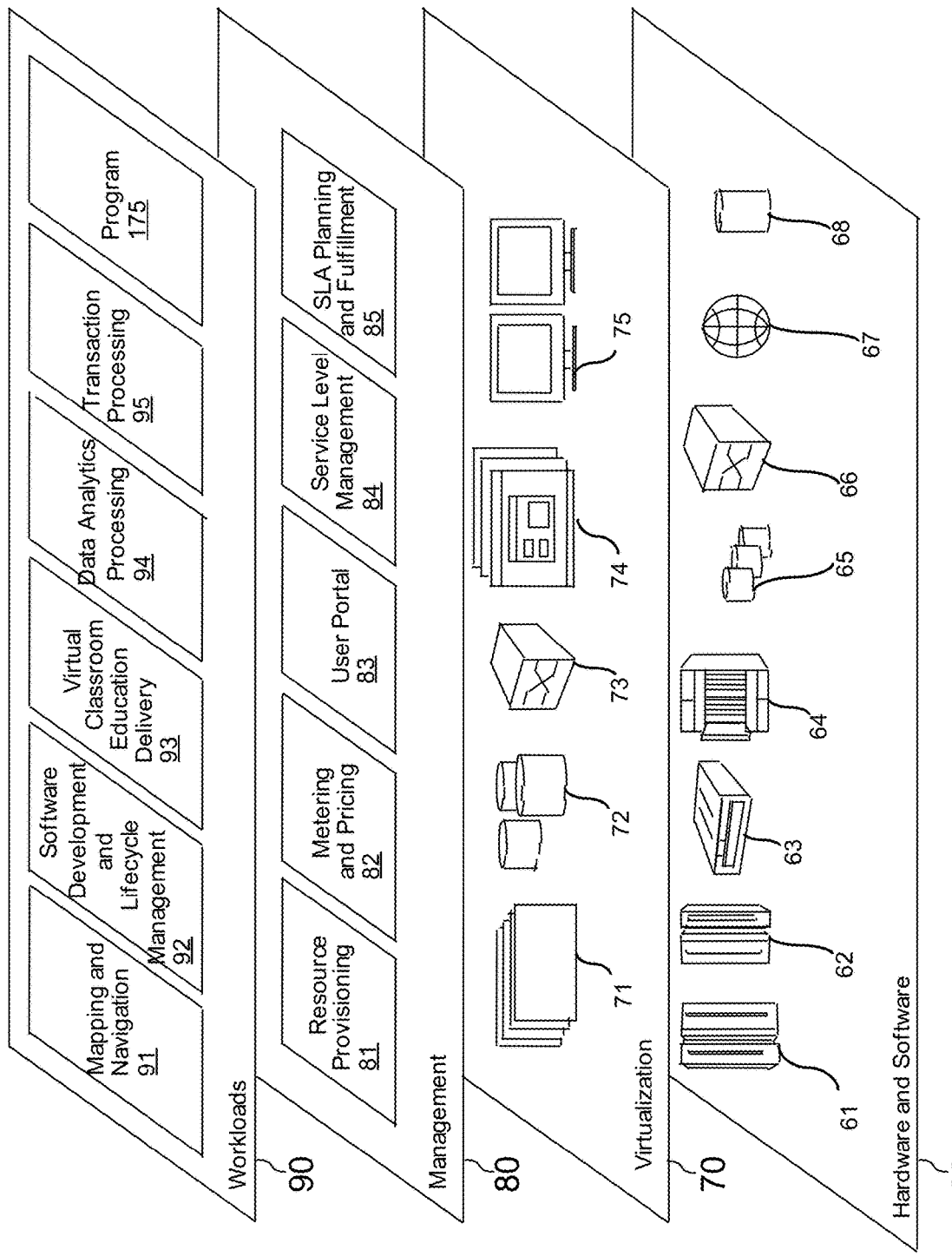
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and attendee differentiation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for differentiating video call attendees, the method comprising:
   receiving, by one or more computer processors, an identifier, voice data, and facial image data, for a video call attendee;
   associating, by the one or more computer processors, a first machine learning model output, a second machine learning model output and the identifier with the video call attendee;
   receiving, by the one or more computer processors, video call data, the video call data comprising voice data and facial image data;
   identifying, by the one or more computer processors, the video call attendee from the video call data using the first machine learning model;
   identifying, by the one or more computer processors, a display location of the video call attendee's face from the video call data using the second machine learning model;
   augmenting, by the one or more computer processors, the video call data with a mark at a mark location; and
   displaying, by the one or more computer processors, the augmented video call data.

2. The computer implemented method according to claim 1, further comprising:
   receiving, by the one or more computer processors, a unique identifier, voice data, and facial image data, for each of a plurality of video call attendees;
   associating, by the one or more computer processors, a unique first machine learning model output, a unique second machine learning model output and the unique identifier for each of the plurality of video call attendees with the video call attendee associated with the unique identifier;
   identifying, by the one or more computer processors, a plurality of display locations from the video call data using the second machine learning model, each of the plurality of display locations corresponding to one of the plurality of video call attendees; and
   identifying, by the one or more computer processors, the mark location for each of the plurality of video call attendees according to the plurality of display locations.

3. The computer implemented method according to claim 1, wherein the mark is associated with the identifier.

4. The computer implemented method according to claim 1, wherein the mark relates to the act of speaking.

5. The computer implemented method according to claim 1, wherein the mark includes the facial image data.

6. The computer implemented method according to claim 1, further comprising removing, by the one or more computer processors, the mark from the augmented video call data according to first machine learning model.

7. The computer implemented method according to claim 1, wherein the mark location is associated with the display location.

8. A computer program product for differentiating video call attendees, the computer program product comprising one or more computer readable storage devices and collectively stored program instructions on the one or more computer readable storage devices, the stored program instructions comprising:
   program instructions to receive an identifier, voice data, and facial image data, for a video call attendee;
   program instructions to associate a first machine learning model output, a second machine learning model output and the identifier with the video call attendee;
   program instructions to receive video call data, the video call data comprising voice data and facial image data;
   program instructions to identify the video call attendee from the video call data using the first machine learning model;
   program instructions to identify a display location of the video call attendees face from the video call data using the second machine learning model;
   program instructions to augment the video call data with a mark at a mark location; and
   program instructions to display the augmented video call data.

9. The computer program product according to claim 8, the stored program instructions further comprising:
   program instructions to receive unique identifier, voice data, and facial image data, for each of a plurality of video call attendees;
   program instructions to associate a unique first machine learning model output, a unique second machine learning model output and the unique identifier for each of the plurality of video call attendees with the video call attendee associated with the unique identifier;
   program instructions to identify a plurality of display locations from the video call data using the second machine learning model, each of the plurality of display locations corresponding to one of the plurality of video call attendees; and
   program instructions to identify the mark location for each of the plurality of video call attendees according to the plurality of display locations.

10. The computer program product according to claim 8, wherein the mark is associated with the identifier.

11. The computer program product according to claim 8, wherein the mark relates to the act of speaking.

12. The computer program product according to claim 8, wherein the mark includes the facial image data.

13. The computer program product according to claim 8, the stored program instructions further comprising program instructions to remove the mark from the augmented video call data according to first machine learning model.

14. The computer program product according to claim 8, wherein the mark location is associated with the display location.

15. A computer system for differentiating video call attendees, the computer system comprising:
   one or more computer processors;
   one or more computer readable storage devices; and
   stored program instructions on the one or more computer readable storage devices for execution by the one or more computer processors, the stored program instructions comprising:
   program instructions to receive an identifier, voice data, and facial image data, for a video call attendee;
   program instructions to associate a first machine learning model output, a second machine learning model output and the identifier with the video call attendee;
   program instructions to receive video call data, the video call data comprising voice data and facial image data;

program instructions to identify the video call attendee from the video call data using the first machine learning model;
program instructions to identify a display location of the video call attendees face from the video call data using the second machine learning model;
program instructions to augment the video call data with a mark at a mark location; and
program instructions to display the augmented video call data.

16. The computer system according to claim 15, the stored program instructions further comprising:
program instructions to receive unique identifier, voice data, and facial image data, for each of a plurality of video call attendees;
program instructions to associate a unique first machine learning model output, a unique second machine learning model output and the unique identifier for each of the plurality of video call attendees with the video call attendee associated with the unique identifier;
program instructions to identify a plurality of display locations from the video call data using the second machine learning model, each of the plurality of display locations corresponding to one of the plurality of video call attendees; and
program instructions to identify the mark location for each of the plurality of video call attendees according to the plurality of display locations.

17. The computer system according to claim 15, wherein the mark is associated with the identifier.

18. The computer system according to claim 15, wherein the mark relates to the act of speaking.

19. The computer system according to claim 15, wherein the mark includes the facial image data.

20. The computer system according to claim 15, the stored program instructions further comprising program instructions to remove the mark from the augmented video call data according to first machine learning model.

* * * * *